United States Patent [19]

Vaillancourt

[11] Patent Number: 5,557,778
[45] Date of Patent: Sep. 17, 1996

[54] STAR HUB CONNECTION DEVICE FOR AN INFORMATION DISPLAY SYSTEM

[75] Inventor: Dennis G. Vaillancourt, South Dartmouth, Mass.

[73] Assignee: Network Devices, Inc., Pocasset, Mass.

[21] Appl. No.: 335,034

[22] Filed: Nov. 7, 1994

[51] Int. Cl.$^6$ .................................................. H04L 12/403
[52] U.S. Cl. ........................................................... 395/500
[58] Field of Search ..................... 395/500; 340/825.02, 340/825.06, 825.07, 825.08; 358/407

[56] References Cited

U.S. PATENT DOCUMENTS

| | | | |
|---|---|---|---|
| 4,701,756 | 10/1987 | Burr | 340/825.02 |
| 5,296,936 | 3/1994 | Pittas et al. | 358/407 |
| 5,434,861 | 7/1995 | Pritty et al. | 370/85.8 |

OTHER PUBLICATIONS

Kumar, "Adaptive Load Control of the Central Processor in a Distributed System with a Star Topology", IEEE Transactions on Computers, Nov. 1989, vol. 38, No. 11, pp. 1502–1512.

Ong et al., "Centralized and Distributed Control for Multimedia Conferencing", Communications 1993 IEEE Int'l Conf., 1993, pp. 197–201.

Sens et al., "STAR: A Fault–Tolerant System for Distributed Applications", Parallel and Distributed Processing, 1993 Symposium, 1993, pp. 656–660.

Fragopoulou et al., "Optimal Communication Algorithms on the Star Interconnection Network", Parallel and Distributed Processing, 1993 Symposium, 1993, pp. 702–711.

Dattatreya et al., "Average Response Time Minimization in Star–Connected Computer Networks", Parallel and Distributed Processing, 1990 Proceedings, 1990, pp. 591–594.

Akl et al., "Data Communication and Computational Geometry on the Star and Pancake Interconnection Networks", Parallel and Distributed Processing, 1991 Proceedings, 1991, pp. 415–422.

Sur et al., "Super Star: A New Optimally Fault Tolerant Network Architecture", Distributed Computing Systems, 1991 Int'l Conf., 1991, pp. 590–597.

*Primary Examiner*—Kevin J. Teska
*Assistant Examiner*—Stephen J. Walder, Jr.
*Attorney, Agent, or Firm*—Lappin & Kusmer

[57] ABSTRACT

A star hub connection device, or connector, for an information display system. The connector has a plurality of ports each of which is either a host port, a device port, or a programmable port. Each of the programmable ports includes circuitry that allows the programmable port to selectively operate as a device port or as a host port. One of the host ports is associated with a first set of ports and a second set of ports, and the first set contains at least one programmable port which is associated with a third set of ports. The connector further includes a controller for selectively controlling each of the programmable ports to operate as a device port or as a host port, and a programmable coupler that is responsive to the controller. The programmable coupler configures the host port and its associated first set of ports as a first star hub connector when the controller controls the programmable port in the first set to operate as a device port. The programmable coupler configures the host port and the second set of ports as a second star hub connector and configures the programmable port in the first set and the third set of ports as a third star hub connector when the controller programs the programmable port in the first set to operate as a host port.

9 Claims, 8 Drawing Sheets

STAR HUB CONNECTION DEVICE FOR AN INFORMATION DISPLAY SYSTEM

BACKGROUND OF THE INVENTION

The present invention relates to devices for distributing data, and more particularly to star hub connection devices used in information display systems for coupling computers to peripheral devices.

Mid-range computers, such as an IBM 3X, AS/400® computer, generally communicate with several peripheral devices, such as terminals, printers, and the like, via a computer network such as an information display system, or more specifically a 5250 Information Display System. In such systems, the computer is typically referred to as the host, or the host computer.

Hosts often have one or more controller cards for controlling input/output functions. Each such controller card generally has several input/output ports, and each of these ports is typically capable of communicating with several peripheral devices. In one common information display system, each port of the host controller card is coupled to all of its associated peripheral devices via a connection device (or connector). The connection device typically has a host port, which is coupled to an input/output port of the host controller card, and several device ports, each of which is coupled to a single peripheral device. The connection device permits the input/output port of the host controller card to address each peripheral device that is coupled to a device port of the connector.

FIG. 1 shows one such prior art 5250 Information Display System 100 in which a controller card 110 of an AS/400® host computer, is coupled to two sets of seven peripheral devices 122 and 124 via a Gemini-2000 connection device 130 which is manufactured by Network Devices, Inc., of Sandwich, Mass. The Gemini-2000 connector 130 has two host transceiver ports 132 and 142 for communicating with the host computer controller card, and two sets of seven device transceiver ports 133–139 and 143–149 for communicating with peripheral devices. Connector 130 is a dual channel device with ports 132–139 forming the first channel and with ports 142–149 forming the second channel. Typically, each controller card of the AS/400® computer has eight input/output ports, and each of these ports is capable of addressing up to seven peripheral devices (however, each card can only address a maximum of forty peripheral devices).

In information display system 100, an input/output port 112 of the AS/400® controller card 110 is coupled to host port 132 of connection device 130, and an input/output port 114 of controller card 110 is coupled to host port 142 of connection device 130. The remaining six input/output ports 116 of controller card 110 are unused. Each device port in the first channel 133–139 is connected to one of the seven peripheral devices 122, and each device port in the second channel 143–149 is connected to one of the seven peripheral devices 124. Connection device 130 allows port 112 of controller card 110 to communicate with the first set of seven peripheral devices 122, and further allows port 114 of controller card 110 to communicate with the second set of seven peripheral devices 124.

FIG. 2 is a block diagram of the information display system 100 showing the internal topology of connector 130. Host port 132 is coupled to the device ports of the first channel 133–139 via a 1:7 star network 150. Similarly, host port 142 is coupled to the device ports of the second channel 143–149 via a 1:7 star network 152. A star network allows its host port to broadcast a signal to each of its associated device ports, and further provides each of the device ports equal access to the host port. Typically, signals applied to the host port from an input/output port of a controller card contain an address component and a data component. Such a signal is broadcast to all of the peripheral devices that are coupled to the star network, however, only the peripheral device having the proper address will process the data component of the signal.

Connection device 130 is typically referred to as dual star hub connector. The ports of the first channel 132–139 form a star hub connector 160, and the ports of the second channel form a star hub connector 162.

In the past, each peripheral device performed a single task and therefore could be fully accessed by the host computer via a single address. Such single address peripheral devices are now referred to generically as single-session peripheral devices. Each of the peripheral devices shown in FIGS. 1 and 2 are single-session peripheral devices. Today, multiple session peripheral devices, which can perform a plurality of tasks simultaneously, such as personal computers and other sophisticated devices frequently serve as peripheral devices for host computers. To fully utilize such a multiple session peripheral device, the host computer must communicate with the peripheral device via more than one address. Such multiple session devices are not to be confused with software generated multiple sessions that allow a single peripheral device to perform multiple tasks at the same address. In general, a peripheral device which requires two distinct addresses is referred to as a two-session device. Similarly, a peripheral device which requires three distinct addresses is referred to as a three-session device.

FIG. 3 shows an information display system 300 which illustrates a limitation associated with prior art connector 130. In system 300, input/output port 112 is connected to host port 132, two two-session peripheral devices 322 are connected to device ports 137, 138, and one three-session peripheral device 324 is connected to device port 139 of hub 160. Further, input/output port 114 is connected to host port 142, three two-session devices 326 are connected to device ports 143–145, and one single-session device 328 is connected to device port 146 of hub 162. Each hub 160, 162 is connected to a collection of peripheral devices that uses a total of seven distinct addresses. Since each input/output port of the controller card 110 can only supply a maximum of seven addresses, device ports 133–136 of hub 160 and device ports 147–149 of hub 162 must necessarily remain unconnected to any peripheral devices and are therefore wasted.

Prior art connectors such as connector 130 can only be fully utilized if all of the device ports are connected to single-session peripheral devices. If any one device port is connected to a multiple session device, one or more of the remaining device ports can not be utilized. Such ports add to the cost of the connector and yet they can not be connected to a peripheral device.

There is therefore a need for a connection device that provides the ability to connect a host computer to a variety of configurations of single and multiple session peripheral devices while providing for a higher utilization of the available device ports.

It is therefore an object of the invention to provide an improved programmable star hub connection device that can connect a host computer to a variety of configurations of single and multiple session peripheral devices while providing for a higher utilization of the available device ports.

Other objects and advantages of the present invention will become apparent upon consideration of the appended drawings and description thereof.

SUMMARY OF THE INVENTION

In one aspect, the invention provides a star hub connection device (or connector) for an information display system. The connector has a plurality of ports each of which is either a host port, a device port, or a programmable port. Each of the programmable ports includes circuitry that allows the programmable port to selectively operate as a device port or as a host port. One of the host ports is associated with a first set of ports and a second set of ports, and the first set contains at least one programmable port which is associated with a third set of ports. The connector further includes a controller for selectively controlling each of the programmable ports to operate as a device port or as a host port, and a programmable coupler that is responsive to the controller. The programmable coupler configures the host port and its associated first set of ports as a first star hub connector when the controller controls the programmable port in the first set to operate as a device port. The programmable coupler configures the host port and the second set of ports as a second star hub connector and configures the programmable port in the first set and the third set of ports as a third star hub connector when the controller programs the programmable port in the first set to operate as a host port.

Each port in the third set may be a device port. Further, each port in the second set may be a device port. Each port in the third set may also be a port in the first set, and each port in the second set may also be a port in the first set. The first set may contain only one programmable port and a plurality of device ports.

One preferred connector according to the invention contains one host port, one programmable port, and a plurality of device ports. One such preferred connector contains six device ports.

In another aspect, the invention provides a star hub connection device (or connector) having a plurality of ports, each of which is either a host port, a programmable port, or a device port. Each of the programmable ports includes circuitry that allows the programmable port to selectively operate as a device port or as a host port. A first programmable port is associated with a first set of ports and a second set of ports, the first set containing at least one additional programmable port. The additional programmable port is associated with a third set of ports. The connector further includes a controller for selectively controlling each of the programmable ports to operate as a host port or a device port. The connector further includes a programmable coupler that is responsive to the controller. The programmable coupler configures the first programmable port and the ports of the first set as a first star hub connector when the controller programs the additional programmable port to operate as a device port. The programmable coupler further configures the first programmable port and the ports of the second set as a second star hub connector and configures the additional programmable port and the ports of the third set as a third star hub connector when the controller programs the first programmable port and the additional programmable port to operate as host ports.

BRIEF DESCRIPTION OF THE DRAWINGS

For a fuller understanding of the nature and the objects of the invention, reference should be made to the following detailed description and the accompanying drawings in which like reference numerals refer to like elements and in which.

DETAILED DESCRIPTION OF THE ILLUSTRATED EMBODIMENT

Figure 1:
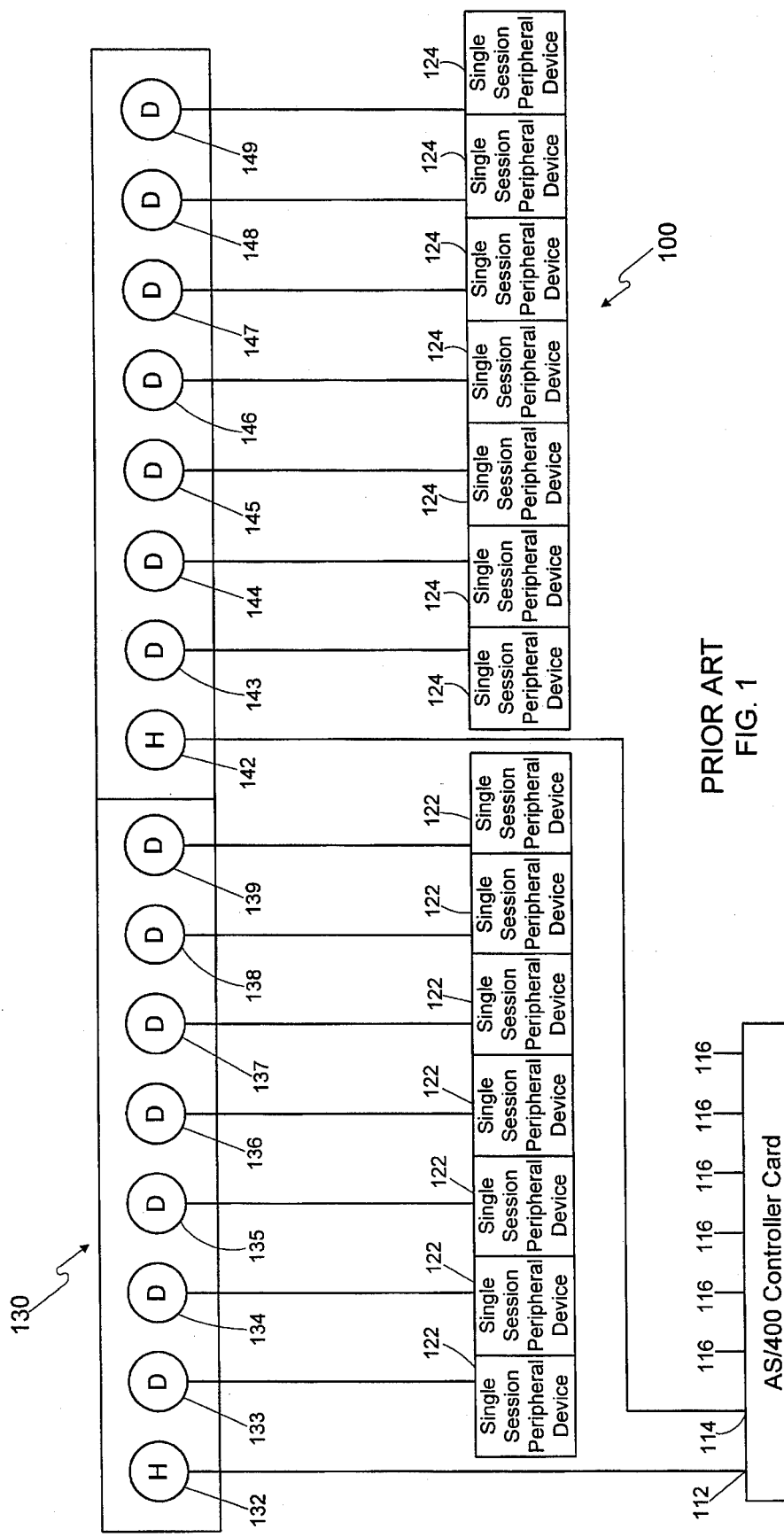
FIG. 1 is a block diagram of 5250 Information Display System using a prior art connection device.
Figure 2:
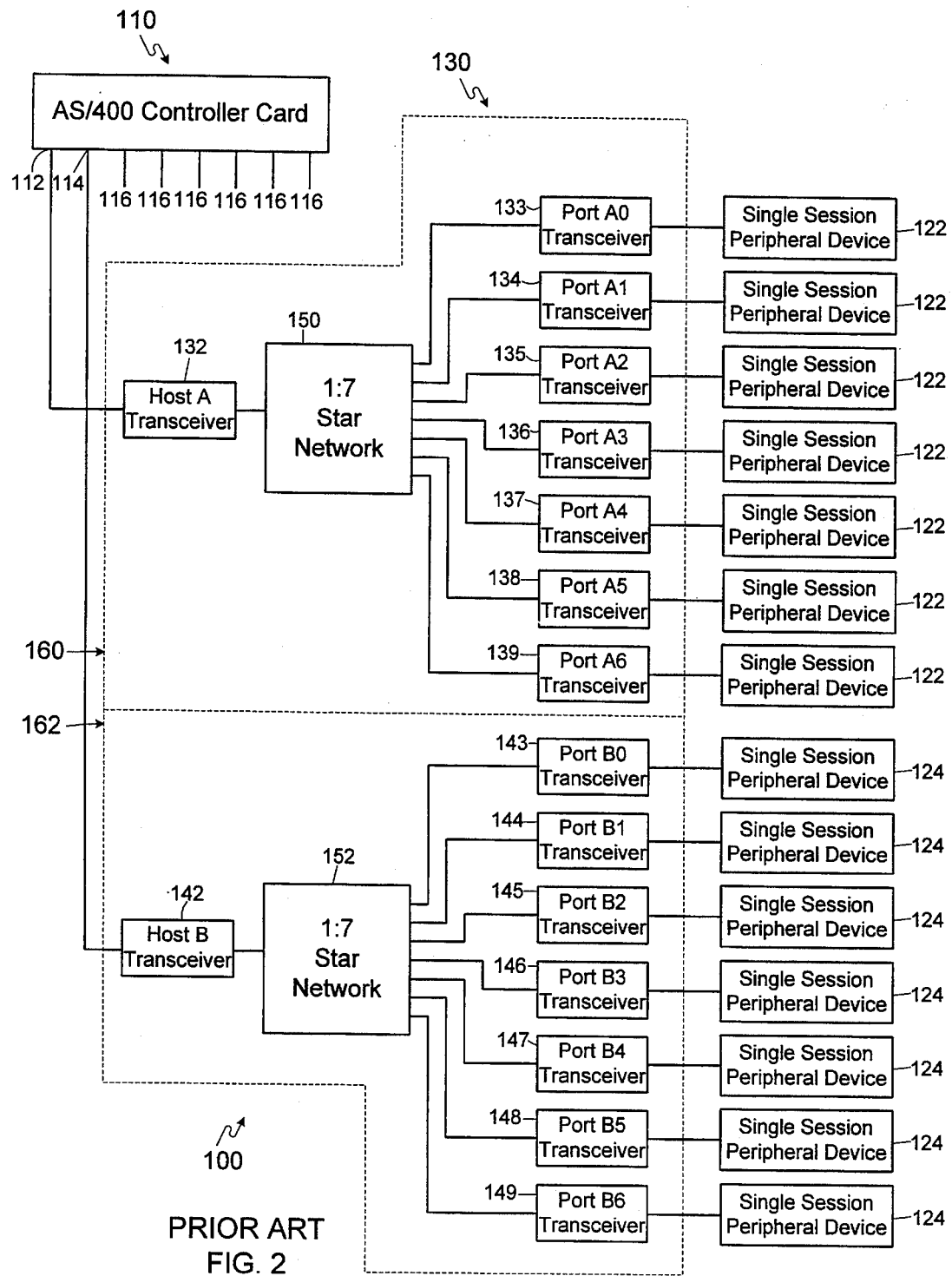
FIG. 2 is a block diagram of the information display system shown in FIG. 1 showing the internal topology of the connection device.
Figure 3:
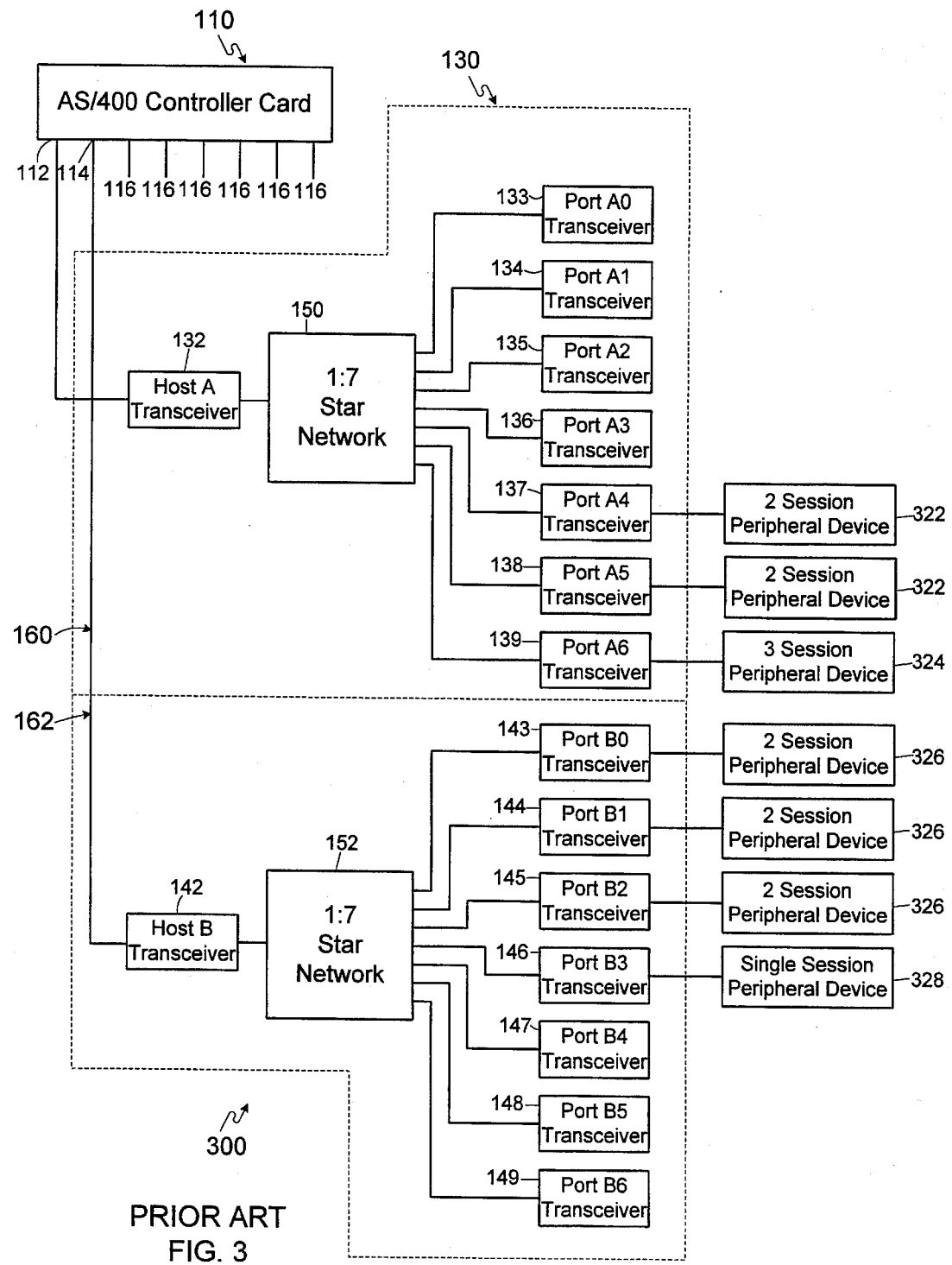
FIG. 3 is a block diagram of a 5250 Information Display System illustrating a limitation associated with the prior art connector shown in FIGS. 1 and 2.
Figure 4:
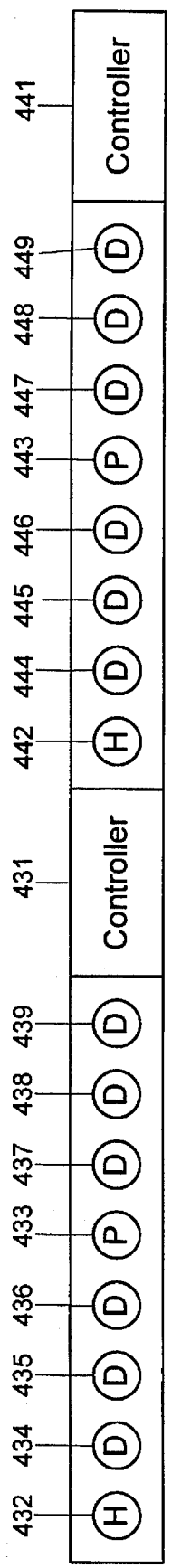
FIG. 4 is a block diagram of a star hub connection device according to the invention.

FIG. 4 shows a preferred embodiment of a star hub connection device (or connector) 430 according to the invention. Connection device 430 has two host transceiver ports 432 and 442, two sets of six device transceiver ports 434–439 and 444–449, two programmable transceiver ports 433,443, and two controllers 431,441. Connector 430 is a dual channel device with ports 432–439 and controller 431 forming the first channel and with ports 442–449 and controller 441 forming the second channel. As will be discussed further below, each channel can be programmed to operate as a single star hub connector or as a dual star hub connector.

Each programmable port 433,443 contains programmable circuitry that allows the port to selectively function as either a host port, which can communicate with a host computer, or as a device port, which can communicate with a peripheral device. As will be discussed further below, controllers 431, 441 control the function of the programmable ports and the internal topology of the connector 430. Controller 431 may configure the first channel as a single hub, or as a dual hub, and similarly, controller 441 may configure the second channel as a single hub or as a dual hub. In the single hub configuration, a channel functions as a single star hub connector having one host port and seven device ports, one of which is a programmable port that has been programmed to operate as a device port. In the dual hub configuration, a channel functions as two star hub connectors, each having one host port and three device ports. In this two hub configuration, the host port of one of the hubs is a programmable port that has been programmed to operate as a host port.

Figure 5A:
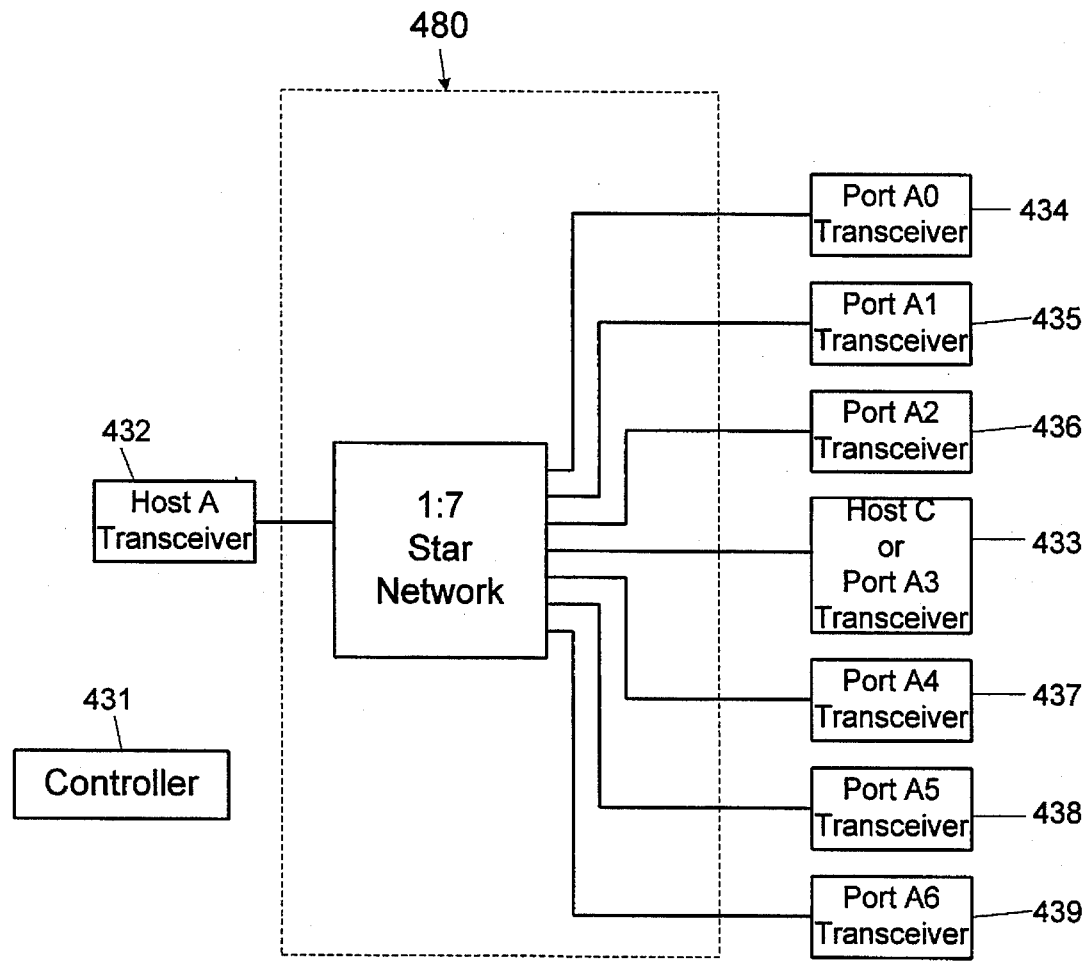
FIGS. 5A and 5B are block diagrams illustrating the programmable nature of the star hub connection device shown in FIG. 4.

FIG. 5A shows the first channel programmed to operate in the single star hub configuration. In this configuration, controller 431 has programmed programmable port 433 to operate as a device port. Controller 431 has further configured a programmable coupler 480, which is included in connector 430, such that host port 432 is linked to device ports 434–439 and programmable port 433 via a virtual 1:7 star network.

Figure 5B:
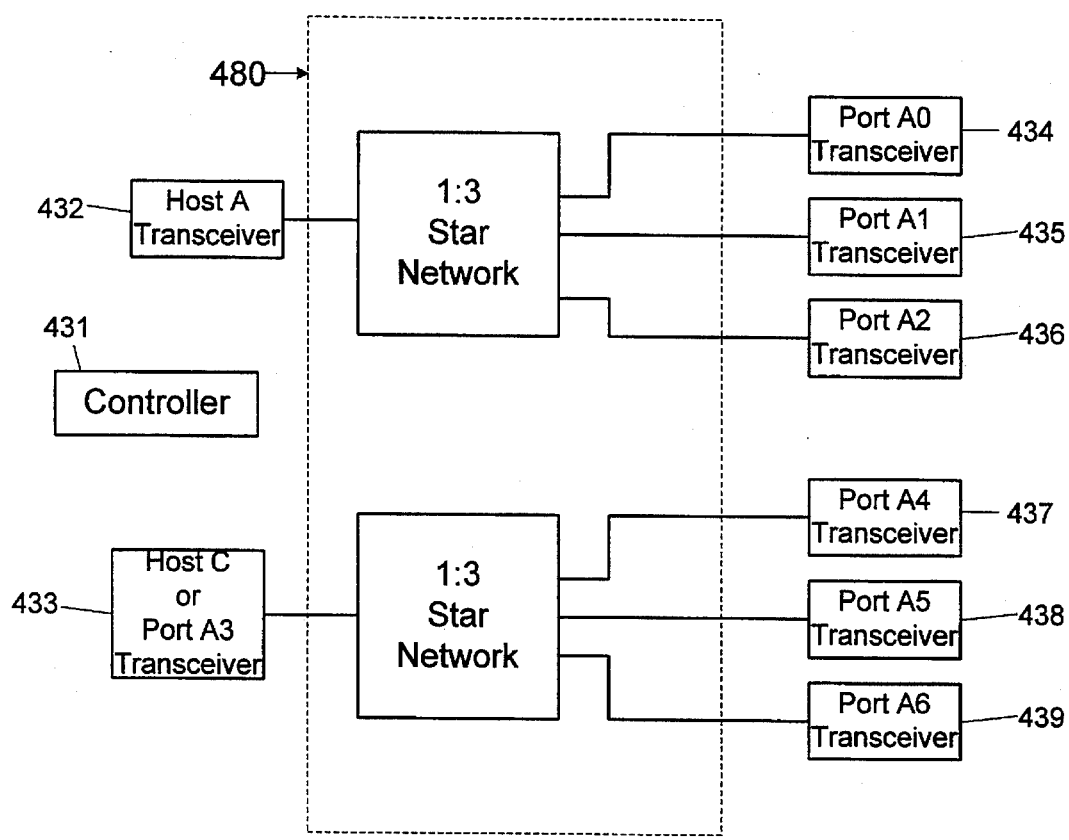

FIG. 5B shows the first channel programmed to operate in the dual star hub configuration. In this configuration controller 431 has programmed programmable port 433 to operate as a host port. Controller 431 has further configured programmable coupler 480 such that host port 432 is linked to device ports 434–436 via a virtual 1:3 star network, and such that programmable port 433 is linked to device ports 437–439 via another virtual 1:3 star network.

Figure 6:
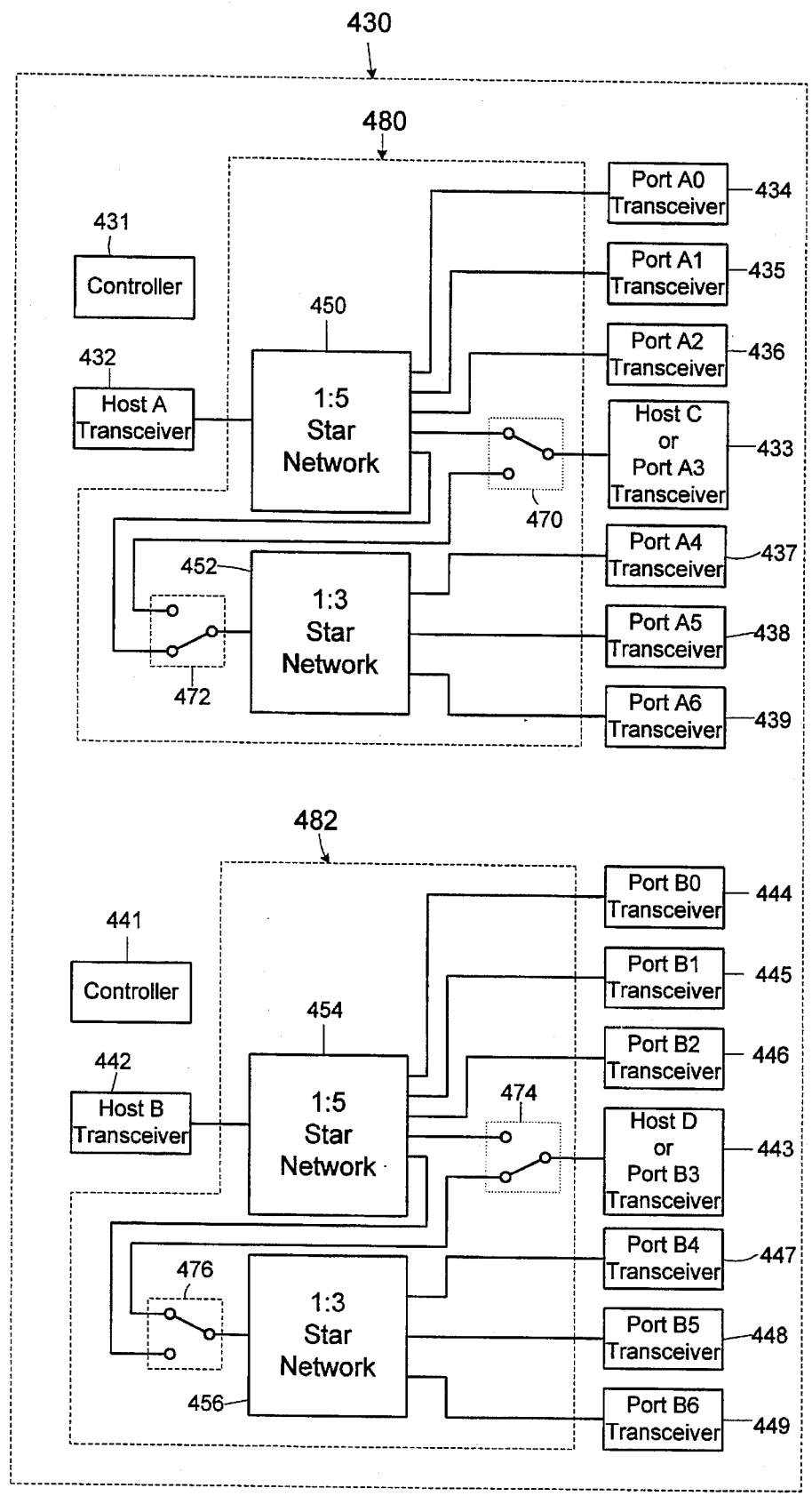
FIG. 6 is a block diagram illustrating one embodiment of a star hub connector according to the invention.

FIG. 6 shows one preferred embodiment of connector 430, in which programmable coupler 480 is implemented using a 1:5 star network 450, a 1:3 star network 452, and two single-pole double-throw switches 470, 472. The second channel also contains a similar programmable coupler 482 that is implemented using a 1:5 star network 454, a 1:3 star network 456, and two single-pole double-throw switches 474, 476. Each of the switches 470, 472, 474, 476 has a common terminal that may be connected to either of two input terminals. The five outputs of star network 450 are connected to port 434, port 435, port 436, an input terminal of switch 470, and an input terminal of switch 472. The three outputs of star network 452 are connected to port 437, port 438 and port 439. The common terminal of switch 470 is connected to port 433, and the common terminal of switch 472 is connected to the input of star network 452. The remaining input terminals of switches 470, 472 are connected together. Similarly for the second channel, the five outputs of star network 454 are connected to port 444, port 445, port 446, an input terminal of switch 474, and an input terminal of switch 476. The three outputs of star network 456 are connected to port 447, port 448 and port 449. The common terminal of switch 474 is connected to programmable port 443, and the common terminal of switch 476 is connected to the input of star network 456. The remaining inputs of switches 474 and 476 are connected together.

In FIG. 6, controller 431 has configured the first channel in the single hub configuration. In this configuration, controller 431 programs programmable port 433 to operate as a device port. Controller 431 further sets switches 470, 472 such that one output of star network 450 is coupled to programmable port 433 via switch 470 and another output of star network 450 is coupled to the input of star network 452 via switch 472. In this configuration, star networks 450, 452 and switches 470, 472 collectively function as a 1:7 star network that couples host port 432 to ports 433–439. The first channel is thus configured as a single star hub connector having one host port and seven device ports.

In FIG. 6, controller 441 has configured the second channel in the dual hub configuration. In this configuration, controller 441 programs programmable port 443 to operate as a host port. Controller 441 further sets switches 474, 476 such that programmable port 443 is connected to the input of star network 456. In this configuration star network 454 functions as a 1:3 star network coupling host port 442 to device ports 444–446. The remaining two outputs of star network 454 are not connected to any port. Further, star network 456 and switches 474, 476 collectively form a 1:3 star network connecting programmable port 443 to device ports 447–449. Therefore, ports 442 and 444–446 form one star hub connector, and ports 443 and 447–449 form another star hub connector.

Each channel of connector 430 may thus be configured as a single hub having one host port and seven device ports (one of which is a programmable port programmed to operate as a device port) as illustrated by the ports of the first channel 432–439. Alternatively, each channel of connector 430 may be configured as two hubs each having one host port and three device ports (in which the host port of one of the two hubs is a programmable port programmed to operate as a host port) as illustrated by the ports of the second channel 442–449. Controllers 431, 441 may be implemented as a set of manually or electronically controlled switches.

Figure 7:
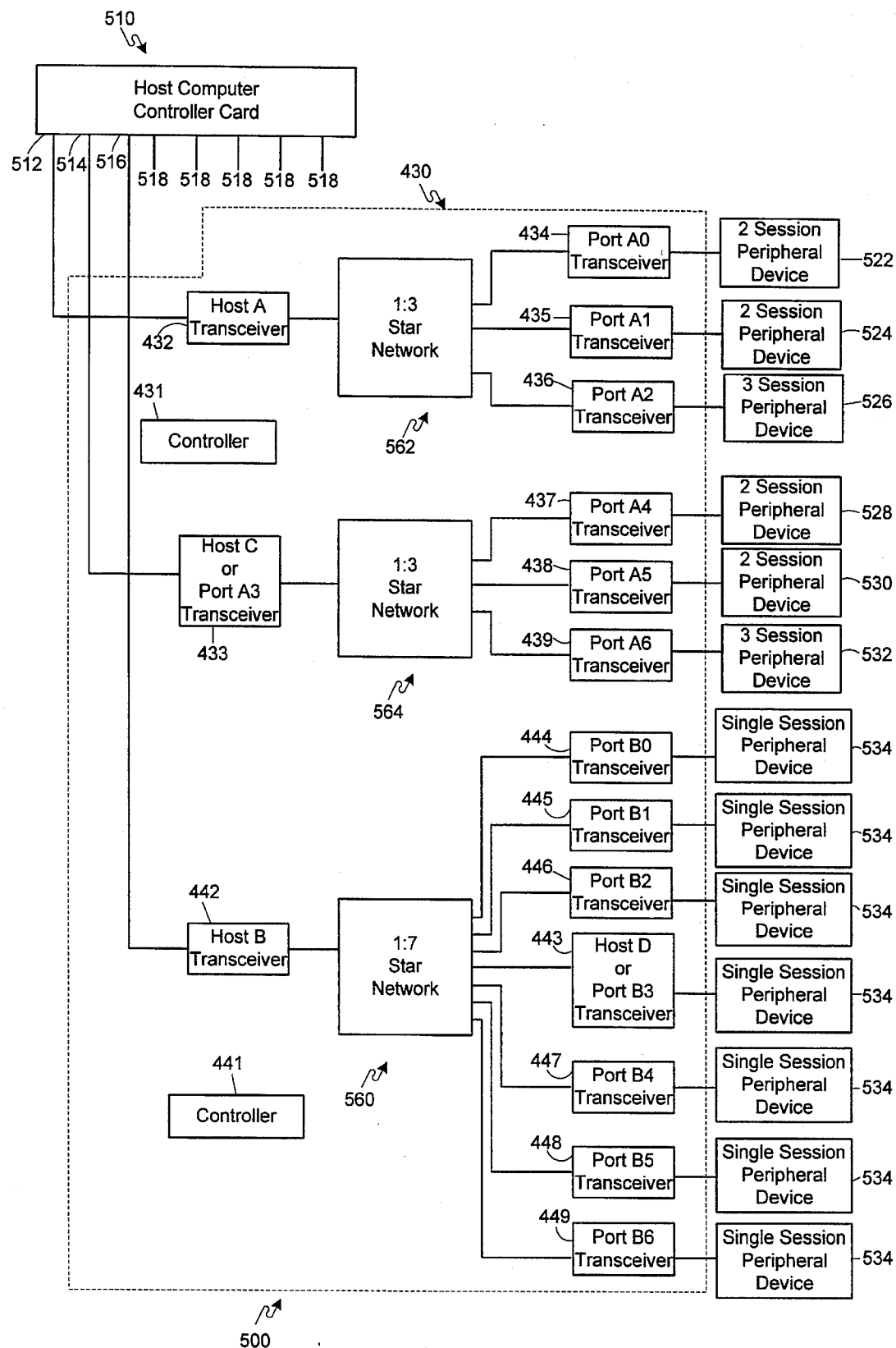
FIG. 7 is a block diagram of an information display system illustrating the programmable nature of the star hub connection device shown in FIG. 4.

FIG. 7 is a block diagram of an information display system 500 that illustrates the programmable nature of connector 430. System 500 may be a 5250 protocol system or some other system. Input/output ports 512, 514, and 516 of a host computer controller card 510 are connected to host port 432, programmable port 433, and host port 442, respectively. Controller card 510 may be a controller card for an AS/400® computer, or a controller card for some other model of computer. The remaining input/output ports 518 of controller card 510 are unused. Two two-session peripheral devices 522, 524 are connected to device ports 434, 435, respectively, and a three-session peripheral device 526 is connected to device port 436. Two two-session peripheral devices 528, 530 are connected to device ports 437, 438, respectively, and a three-session peripheral device 532 is connected to device port 439. Programmable port 443 and device ports 444–449 are each coupled to one of seven single-session peripheral devices 534.

Controller 441 has configured the ports of the second channel 442–449 into a single star hub connector 560. Hub 560 is formed by host port 442, device ports 444–449, and programmable port 443 which has been programmed to operate as a device port. Input/output port 516 of controller card 510 couples to seven single-session peripheral devices 534 via hub 560.

Controller 431 has configured the ports of the first channel 432–439 into two star hub connectors 562, 564. Hub 562 includes host port 432 and device ports 434–436. Hub 564 includes programmable port 433 (which has been programmed to operate as a host port) and device ports 437–439. Input/output port 512 couples to peripheral devices 522, 524, 526 via hub 562, and input/output port 514 couples to peripheral devices 528, 530, 532 via hub 564.

Hub 562 is coupled to a collection of peripheral devices 522, 524, 526 that utilizes seven distinct addresses. Assuming input/output port 512 can only supply seven addresses (as is the case if the host computer is an AS/400®), hub 562 utilizes the maximum number of addresses that can be supplied by input/output port 512. If the first channel were configured as a single hub, the remaining device ports 437–439 would necessarily remain unconnected to any peripheral devices. By dividing the first channel into two hubs, connector 430 permits those remaining ports 437–439 to join a different hub and couple to an input/output port of the host controller card that still has available addresses.

Star hub connection device 430 therefore provides flexibility and increased utilization of device ports. If it is desirable to connect the host computer to a large number of single-session peripheral devices, connection device 430 can be configured as two hubs of the type shown by hub 560 each of which can couple to seven peripheral devices. Alternatively, if it is desirable to connect the host computer to multiple session devices, one or both channels of connector 430 can be configured as two hubs of the type shown by hubs 562 and 564.

The invention has been discussed in terms of a preferred dual channel star hub connector 430, each channel having one host port, one programmable port, and six device ports. As those skilled in the art will appreciate many other configurations are possible and are within the scope of the invention. For example, a connection device according to the invention may have one host port, two programmable ports and nine device ports. Such a connector could function in four different configurations. In the first configuration, both programmable ports operate as device ports, and the connector forms a hub having one host port and eleven device ports (two of which are programmable ports operating as device ports). In the second configuration both of the programmable ports operate as host ports, and the connector forms three hubs each having one host port and three device ports. In the third and forth configurations, one of the programmable ports operates as a host port and the other operates as a device port (i.e., in the third configuration a first programmable port operates as a device port and a second programmable port operates as a host port, and in the forth configuration the first programmable port operates as a host port and the second programmable port operates as a device port). In these configurations the connector forms two hubs, one having one programmable port operating as a host port and three device ports, and the other hub having a host port, a programmable port operating as a device port and six device ports. In still other configurations, each programmable port may be associated with a different number of device ports.

Therefore, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Having described the invention, what is claimed as new and secured by Letters Patent is:

1. A star hub connection device for an information display system, comprising:
    A. a plurality of ports, wherein each of said ports is a device port, a host port, or a programmable port, each of said programmable ports being selectively operable as a device port or as a host port, one of said host ports being associated with a first set of ports and a second set of ports, said first set including at least one programmable port, said one programmable port in said first set being associated with a third set of ports;
    B. a controller for selectively controlling each of said programmable ports to operate as a host port or as a device port; and
    C. programmable coupling means responsive to said controller for selectively configuring said ports as star hub connectors, said programmable coupling means configuring said one host port and said ports in said first set as a first star hub connector when said controller controls said one programmable port in said first set to operate as a device port, and said programmable coupling means configuring said one host port and said ports in said second set as a second star hub connector and configuring said one programmable port in said first set and said ports in said third set as a third star hub connector when said controller controls said one programmable port in said first set to operate as a host port.

2. A star hub connection device for an information display system according to claim 1, wherein all of said ports in said third set are device ports.

3. A star hub connection device for an information display system according to claim 1, wherein all of said ports in said second set are device ports.

4. A star hub connection device for an information display system according to claim 1, wherein said first set contains only one programmable port and a plurality of device ports.

5. A star hub connection device for an information display system according to claim 1, wherein all of said ports in said third set are also in said first set.

6. A star hub connection device for an information display system according to claim 1, wherein all of said ports in said second set are also in said first set.

7. A star hub connection device for an information display system according to claim 1, wherein said plurality of ports consists of one host port, one programmable port, and a plurality of device ports.

8. A star hub connection device for an information display system according to claim 7, wherein said plurality of device ports consists of six device ports.

9. A star hub connection device for an information display system, comprising:
    A. a plurality of ports, wherein each of said ports is a device port, a host port, or a programmable port, each of said programmable ports being selectively operable as a device port or as a host port, one of said programmable ports being associated with a first set of ports and a second set of ports, said first set including at least one additional programmable port, said additional programmable port being associated with a third set of ports;
    B. a controller for selectively controlling each of said programmable ports to operate as a host port or as a device port; and
    C. programmable coupling means responsive to said controller for selectively configuring said ports as star hub connectors, said programmable coupling means configuring said one programmable port and said ports in said first set as a first star hub connector when said controller controls said one programmable port to operate as a host port and controls said additional programmable port to operate as a device port, and said programmable coupling means configuring said one programmable port and said ports in said second set as a second star hub connector and configuring said additional programmable port and said ports in said third set as a third star hub connector when said controller controls said one programmable port and said additional programmable port to operate as a host ports.

* * * * *